United States Patent [19]
Wolf

[11] 4,154,326
[45] May 15, 1979

[54] COMBINED POWER VALVE AND FLOW DIVIDER

[75] Inventor: Peter Wolf, Baroda, Mich.

[73] Assignee: Lambert Brake Corporation, St. Joseph, Mich.

[21] Appl. No.: 832,558

[22] Filed: Sep. 12, 1977

[51] Int. Cl.² ............... B60K 41/24; B60T 15/06; F16H 57/10
[52] U.S. Cl. ............... 192/4 A; 60/548; 60/550; 60/582; 74/710.5; 303/9; 303/10
[58] Field of Search ............... 192/4 A; 74/710.5; 60/547, 550, 548, 565, 582; 303/9, 10, 11

[56] References Cited

U.S. PATENT DOCUMENTS

| | | | |
|---|---|---|---|
| 2,757,512 | 8/1956 | Foreman | 60/548 |
| 3,439,785 | 4/1969 | Hughson | 192/4 A |
| 3,827,765 | 8/1974 | Husted | 303/52 |
| 3,900,229 | 8/1975 | Husted | 303/52 |

*Primary Examiner*—Allan D. Herrmann
*Attorney, Agent, or Firm*—Olson, Trexler, Wolters, Bushnell & Fosse, Ltd.

[57] ABSTRACT

A closed-center brake system and brake valve are disclosed. A closed-center variable displacement pressure compensated pump delivers fluid pressure to a valve inlet which carries a normally closed check valve. When a valve operating rod is partially withdrawn from the valve, the check valve opens to admit fluid to a valve chamber; fluid pressure and flow are directed from the chamber to ports leading to a vehicle left-hand brake and a vehicle right-hand brake. Should fluid pressure be lost in upstream portions of the system, further pulling action on the valve rod will collapse the chamber and manually deliver pressurized fluid to the brakes. Another brake valve outlet port, located just downstream of the inlet check valve, provides for delivery of pressure compensated fluid back to the pump to cause the pump to operate with desired characteristics. Yet another brake valve outlet port delivers fluid to another system element, such as a hydraulically operated vehicle differential, so as to lock left-hand and right-hand vehicle drive trains together to prevent relative rotation when either the left-hand brake, the right-hand brake, or both brakes are operated.

15 Claims, 3 Drawing Figures

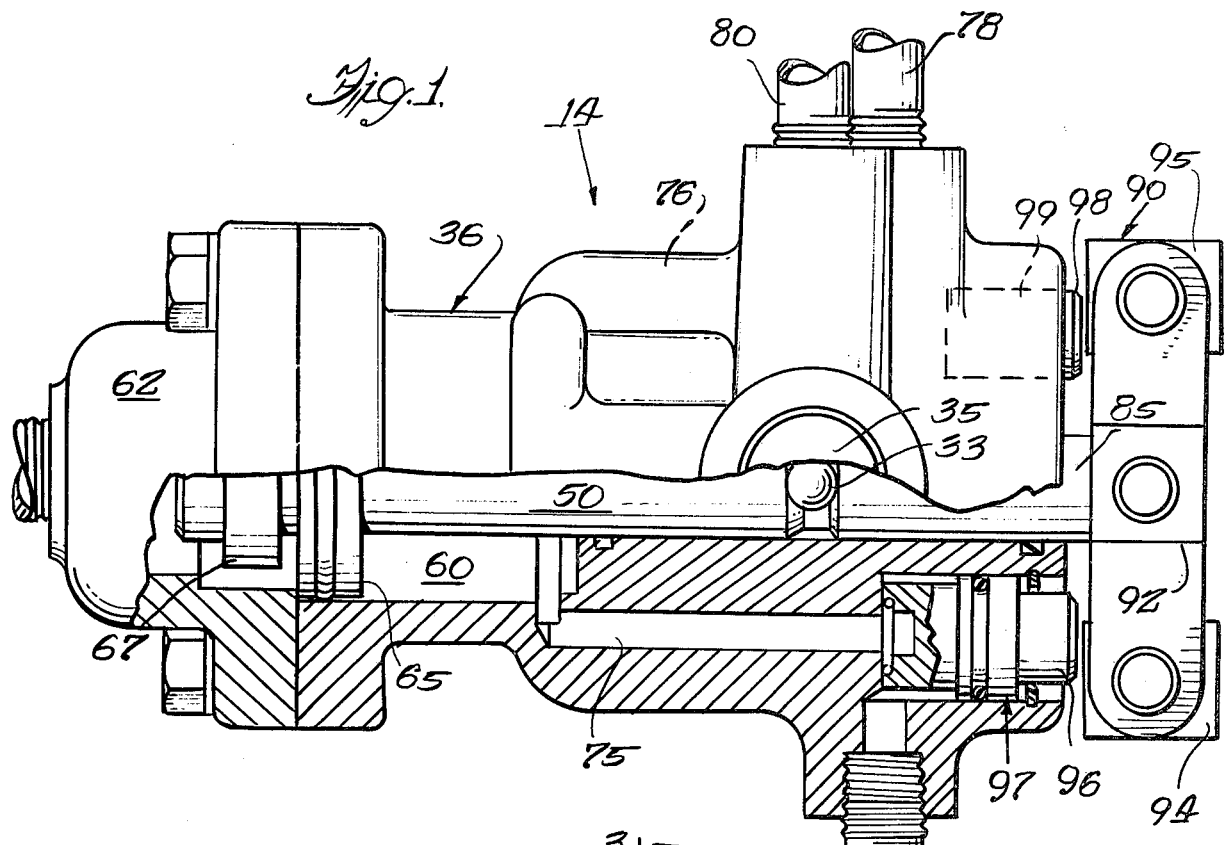
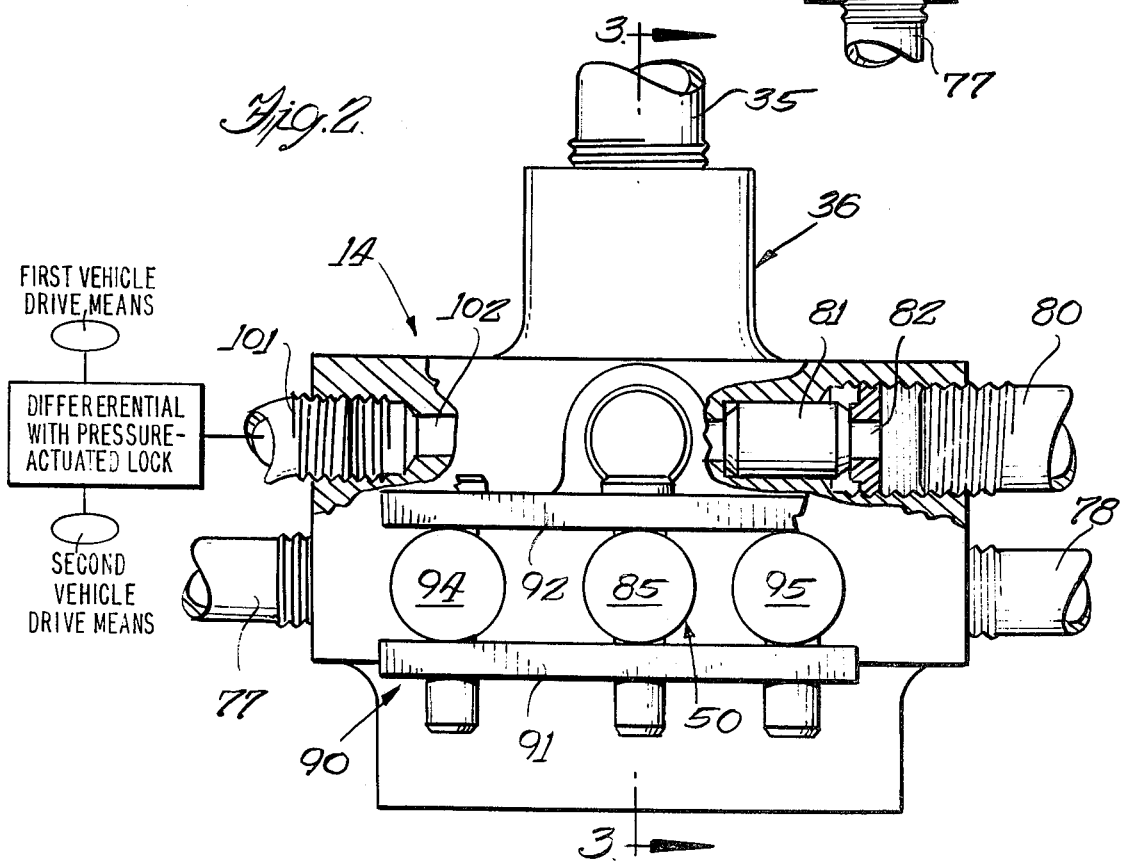

COMBINED POWER VALVE AND FLOW DIVIDER

BACKGROUND OF THE INVENTION

This invention relates generally to braking systems, and more particularly concerns closed-center braking systems for agricultural tractors and like devices.

The use of hydraulic systems on farm tractors and like implements is important to tractor manufacturers and associated organizations. Experience with these systems has shown the desirability of having a brake system and a brake actuator valve having good pressure modulation capability, reliability, and easy serviceability. Generally accepted practice has dictated, until now, that these brake actuator valves be of a spool-type design. However, under at least some circumstances, these systems and valves have provided less than perfect pressure modulation as system hydraulic fluid flow rates vary.

Further, even when valve parts are carefully polished and fitted, internal leakage within the brake valve can, under some circumstances, become a matter of concern. Moreover, the practice of so carefully fitting valve parts has occasionally led to later difficulties in field servicing.

For some time, braking and associated hydraulic systems used in some tractors have utilized a "closed-center" concept. Briefly, these systems utilize a pump which draws fluid from a reservoir and provides, at the pump head, a constant fluid pressure; the rate of fluid flow through the system can vary from nil to whatever amount may be necessary at the time to operate down stream system mechanisims.

It is the general object of the present invention to provide a valve for use with such a closed-center brake system which will improve the performance and operating characteristics of the entire system. A related object is to provide such a valve system which eliminates the expense and reliability problems of spool-type internal valve mechanisms.

Another object is to provide a valve and related braking system in which internal leakage problems are decreased, if not entirely eliminated. An ancillary object is to provide such a valve which is subjected to part wear action to only a limited degree, and which will, in consequence, provide a long valve service life.

Yet another object is to provide a valve and system of the type described which can be offered at low initial cost, and which can be maintained throughout its useful life at a relatively modest service cost.

Another object is to provide a valve for use in a closed-center brake system of the type described which can provide for manual operation should the pump or other system components lose the ability to generate or sustain hydraulic pressure for some reason.

Still another object is to provide a brake valve and a related closed-center braking system which offers independent bracking action to the left and right wheel brakes.

A further object is to provide a valve and associated closed-center brake system which will automatically permit hydraulic operation of an auxiliary system element, such as a tractor differential, upon operation of even one of two brake actuators.

Other objects and advantages of the invention will become apparent upon reading the following detailed description and upon reference to the drawings.

Throughout the drawings, like reference numerals refer to like parts.

BRIEF DESCRIPTION OF THE DRAWINGS

FIG. 1 is a top plan view of an embodiment of the brake valve of the present invention, portions being broken away to show the interior arrangement of the valve in further detail;

FIG. 2 is an end elevational view of the valve shown in FIG. 1, portions of the valve again being broken away to show the internal arrangement of the valve in further detail.

DETAILED DESCRIPTION

Figure 3:
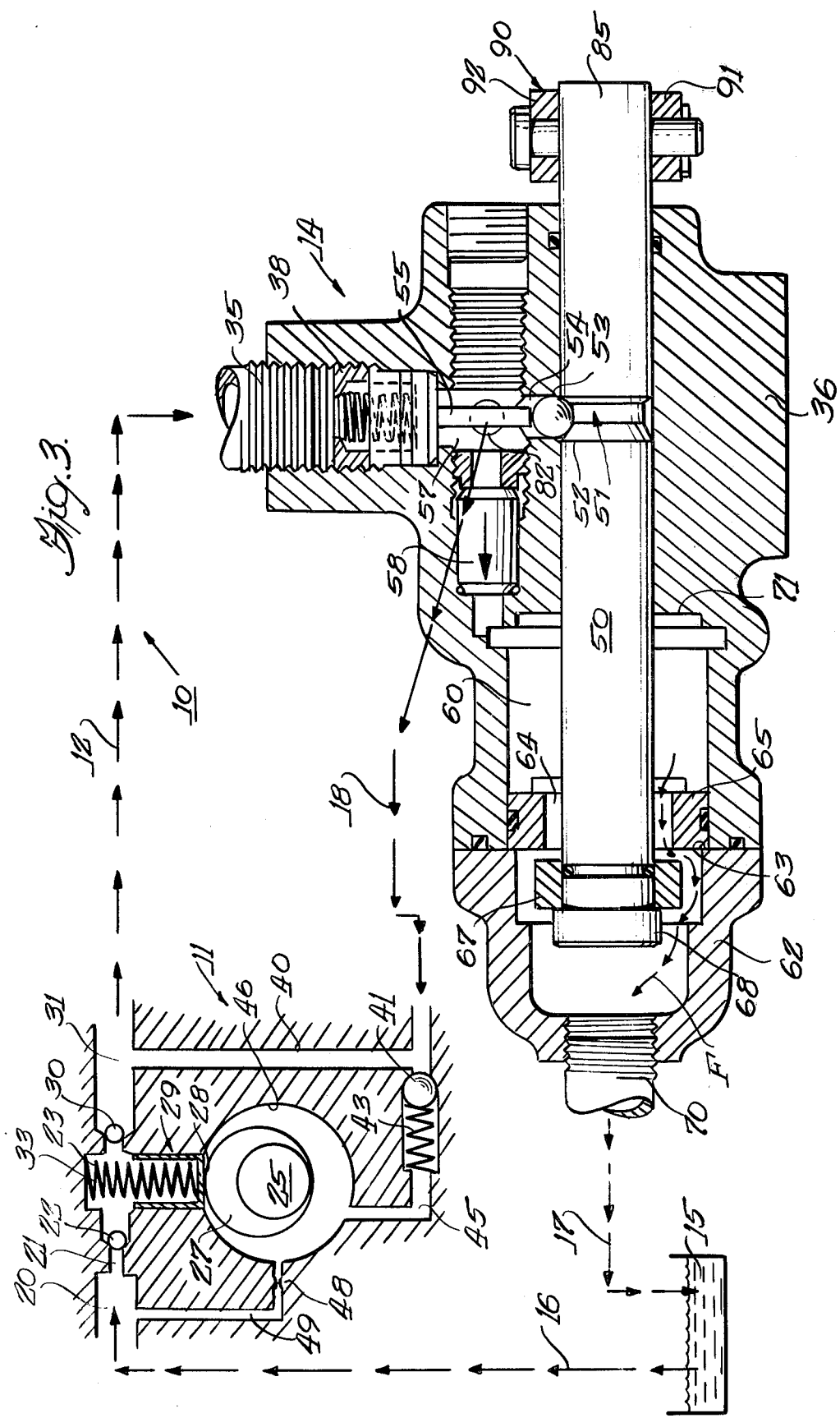
FIG. 3 is a schematic diagram illustrating the closed-center hydraulic system used in association with the valve, and showing the valve in a sectional aspect, the section being taken substantially in the plane of line 3—3 in FIG. 2 and further showing, in a sectional and somewhat diagrammatic form, a closed-center variable displacement pressure compensated radial piston pump used in the system.

While the invention will be described in connection with a preferred embodiment, it will be understood that it is not intended to limit the invention to this embodiment. On the contrary, it is intended to cover all alternatives, modifications, and equivalents as may be included within the spirit and scope of the invention.

The System in General

Turning more specifically to the drawings, FIG. 3 shows a closed-center hydraulic brake system 10 including a closed-center variable displacement pressure compensated radial piston pump 11, which delivers fluid along a path 12 to a novel brake valve 14. Fluid is drawn by the pump 11 from a reservoir 15 along a fluid suction path 16, and is returned to the reservoir 15, when necessary, from the valve 14 along a path 17. Fluid is also discharged from the valve 14 along a path 18 to the pump 11 for pressure compensating action.

The Pump

The pump 11 includes an inlet 20 for admitting from the fluid suction flow path 16 and fluid reservoir 15. A bore 21 delivers fluid through a check valve (here, a ball type check valve 22) to a pump cylinder 23 for pressurization. To pressurize the fluid, a pump shaft 25 eccentrically mounts a cam 27, which can be of circular aspect, for engaging the bottom 28 of a pump piston 29. As the piston 29 rises in the cylinder 23, the fluid is pressurized and is forced through a high-pressure check valve 30 and into a discharge bore 31 for delivery to the high-pressure fluid flow path 12. A piston return spring 33 tends to force the piston 29 in a downward direction so as to provide full-stroke action.

Fluid in the flow path 12 is delivered to an inlet port 35 formed in a housing 36 of the valve 14. In the inlet port 35 is a normally closed check valve 38. It will be understood that when the check valve 38 is in its normally closed position, fluid pressure will build in the flow path 12, but no fluid flow will, in fact, occur.

As the pressure builds in the conduit 12, a corresponding pressure is consequently impressed upon fluid carried in a pump branch line 40 which is connected to the pump fluid discharge port 31 as shown in FIG. 3. When pressure in the branch line 40 has built to a predetermined level, that pressure will overcome the checking action of a ball-type check valve 41 and an associated pre-compressed spring 43, so as to permit fluid in the branch line 40 to be discharged through a flow path 45 to a pump crankcase 46.

In this way, fluid pressure experienced at the pump discharge port 31 and in the flow line 12 is also experienced within the pump crankcase 46 and, indeed, that pressure is directed against the bottom 28 of the piston 29. Now, when the upward force of the fluid within the crankcase 46 pressing upwardly against the piston bottom 28 equals the downward force against the piston bottom 28 (supplied by the spring 33 and fluid within the cylinder 23) the piston 29 will be suspended within the cylinder 23.

Under these conditions, pressure will be maintained on the pressure side of the pump and fluid flow system, but no fluid flow will occur. The piston will be suspended away from the reciprocating action which would otherwise be caused by the eccentric cam 27. To provide a dash-pot relief effect to the crankcase 46, a small orifice 48 is provided in a discharge path 49 leading from the crank case 46 to the pump inlet port 20. Pumps of this type are available from Deere & Company, Moline, Ill.

The Valve

It will be understood from the foregoing that, when the inlet check valve 38 in the brake master control valve 14 is in its normally closed position, no fluid flows through the valve or through downstream system units. Consequently, and in accordance with one aspect of the invention, valve part wear and leakage which can be caused by prolonged fluid flow is eliminated.

As indicated above, the valve 14 includes a housing 36 defining an inlet port 35; carried within the inlet port 35 is a first or inlet check valve 38. A bi-ended valve actuator rod 50 is disposed so as to slide at least partially into and out of the housing 36. In accordance with one aspect on the invention, fluid is admitted to the valve 14 only when braking action is desired. When the vehicle or system operator actuates connector links (not shown) attached to the rod 50, so as to move the rod (to the right as shown in FIG. 3) a rod recess 51 is, of course, also moved (to the right) so as to bring a conical actuator cam surface 52 into engagement with an actuator ball 53 carried in a housing well 54. Radially outward or upward motion of the ball 53 causes the ball to engage and then move upward an interconnector pin 55 to cause opening action in the check valve 38.

When the check valve 38 is opened, fluid flows in a downstream direction through the upstream check valve 38, through a stem bore 57, through a second or downstream check valve 58, and into a chamber 60 defined in a rear portion of the housing 36.

Here, the valve is provided with a cap 62 defining an interior cap bore having a diameter slightly less than the bore of the valve chamber 60. Against an annular step 63 thus created between the cap 62 and the housing 36 rests a slidable annular or apertured piston 65, through which the valve rod 50 extends.

It will be noted that the valve rod 50 fixedly mounts a reaction piston 67, as by an expanded head 68 or other suitable structure. When the valve rod 50 and the reaction piston 67 are located as illustrated in FIG. 3, fluid is permitted to flow at a reduced pressure from the chamber 60, through the aperture flow space 64 formed in the piston 65, around the reaction piston 67, and out a return or exhaust port 70, as indicated by the arrow F. When the valve rod 50 is drawn to the right as illustrated in FIG. 3, the reaction piston 67 is consequently drawn toward the apertured piston 65 to cover the flow space 60. In this way, the two pistons 67 and 65 form, together with the valve housing 36 and a housing opposite end wall 71, a closed, sealed, collapsible form of the chamber 60.

Under these circumstances, little if any fluid flow occurs along the flow path shown by the arrow capital F. And, of course, no fluid can flow back upstream through the valve inlet 35 due to the checking action of the second check valve 58. Rather, fluid is discharged from the chamber 60 along brake outlet bores 75 and 76, as shown in FIG. 1. Thus, fluid is delivered from chamber 60 to left and right brake outlet ports 77 and 78, respectively, as more fully explained below.

In accordance with another aspect of the invention, this valve provides a small resorvoir of fluid for discharge to the brake outlet ports 77 and 78 in a pressurized manner, even if the pump 11 or fluid inlet flow path 12 should become depressurized for any reason. As explained above, fluid delivered to the valve chamber 60 is trapped within the chamber by the closing action of the reaction piston 67 moving toward or against the annular piston 65, and by the stopping action of the second or downstream check valve 58. A quantity of fluid is trapped within the chamber 60 which is sufficient to actuate the brakes through fluid discharge to the left and right brake discharge ports 77 and 78 as the chamber 60 is collapsed by pulling the valve rod 50 at least partially out of the valve 14.

Normally, however, when vehicle brake controls are actuated and the rod 50 is pulled, fluid pressure is transferred, (and fluid flow at least tends to occur) through the inlet valve 35, through the opened check valve 38, through the second check valve 58, into the chamber 60, then through the brake port bores 75 and 76, and out the respective brake discharge ports 77 and 78. To provide pressure compensated fluid to the pump 11 during braking action in accordance with another aspect of the invention, the valve 14 includes a pressure compensated fluid discharge port 80 which communicates with the stem bore 57 located immediately downstream or below the first or inlet check valve 38. In this way, an indication of fluid pressure and flow demand by the valve 14 is quickly and accurately transmitted to the pump 11, and the pump operating characteristics are immediately altered so as to provide fluid pressure in the steady manner contemplated by the system design. A pressure compensation back flow check valve 81 is included in the bore 82 leading from the stem bore 57 to the pressure compensation outlet port 80, so as to prevent loss of pressure in the system fluid flow and pressure-transmitting path 18.

In accordance with yet another aspect of the invention, this valve 14 can deliver fluid pressure to either a left brake outlet port 77 or a right brake outlet port 78, or to both ports simultaneously in any ratio required by the operator as he manipulates the vehicle and the vehicle brakes. To this end, an outer end 85 of the valve rod 50 is pivotally attached to a yoke assembly 90. Here, this yoke 90 takes the form of paired links 91 and 92, to the ends of which are attached actuator blocks 94 and 95. As can be envisioned from FIG. 1, rotation of the links 91 and 92 in a clockwise direction urges the actuator block 94 against the head end 96 of a fluid flow stop member carried in a mating well portion of the bore 75. Correspondingly, this clockwise link rotation frees the opposite actuator block 95 from contact with the head end 98 of a right hand pressure stop member 99. Under these circumstances, the pressure stop 99 is free to move in a forward direction and permit flow out the right-hand brake port 78.

It will also be understood that, under opposite conditions, (i.e. when the links 91 and 92 are rotated in a counter clockwise direction) the actuator block 95 engages the head 98 of the right hand stop member 99 and, correspondingly, the actuator block 94 is freed from contact with the head 96 of the left hand stop member 97. The pressure valve member 97 is then free to move forward and permit fluid flow and fluid pressure transmission from the valve chamber 60, through the bore 75, past the valve stop member 97 and into the left hand valve discharge port 77 to operate a left-hand brake.

In accordance with yet another aspect of the invention, this valve 14 can be constructed to deliver fluid to an auxiliary system element (shown schematically in FIG. 2) such as a tractor differential whenever any brake element (i.e., either the right hand brake, the left hand brake, or both brakes) are actuated. This permits use of this valve with a hydraulically actuated tractor differential, so as to lock that differential and prohibit tractor drive wheels or drive elements from rotating relative to one another whenever either or both tractor brakes are applied. Tractor motive power and traction are thereby markedly enhanced. To this end, an auxiliary fluid pressure delivery port 101 is provided at the top of the valve housing 36, and includes a delivery port 102 extending from the stem bore 67 and positioned substantially opposite the pressure compensation fluid delivery bore 82. When the valve rod 50 is pulled and the valve is operated as explained above, fluid flows through the inlet port 38, and pressure is then transmitted through the port 101 and to the differential or other hydraulic system element.

The invention is claimed as follows:

1. A brake valve for use with a closed-center brake system, the valve comprising a housing defining an elongated bore closed at one end by a fixed end wall, a bi-ended rod extending through the housing end wall and having a first end outside the housing and a second end inside the housing, an apertured piston slidably disposed within the bore, the piston aperture defining a flow space permitting fluid to flow through the apertured piston, the housing defining an exhaust port permitting fluid which has moved past the apertured piston to flow out of the valve, a reaction piston carried on the second end of said rod and radially extending to cover the annular piston flow space, and being adapted to move toward the annular piston so as to halt the flow of fluid through the annular piston and create a movable end wall, the movable end wall, fixed end wall and bore thus defining at least in part a collapsible chamber in the power valve, an inlet port also defined in the housing to provide a fluid path between a closed-center brake system pump and the valve chamber, normally closed first check valve means in the valve inlet port for prohibiting fluid flow into the chamber and through the valve, and check valve actuator means for actuating the check valve and permitting fluid flow into the valve when the valve rod is at least partially withdrawn from the valve and the reaction piston is drawn toward the annular piston.

2. A brake valve according to claim 1 wherein said actuator means include: cam means on the rod means, and pin means extending from the first check valve to a position for engagement so as to cause check valve opening action as the rod is partially withdrawn from the valve.

3. A brake valve according to claim 2 wherein a recess is formed in and on the valve rod, the recess being at least partially defined by a ramped cam surface, the ramped cam surface being located to cause smooth actuator action as the rod is partially withdrawn from the valve.

4. A brake valve according to claim 3 including ball means normally carried at least partly within the valve rod recess, the ball means being located so as to engage the pin means as the rod is partially withdrawn from the brake valve.

5. A brake valve according to claim 1 including a plurality of fluid flow paths extending from the valve chamber, and a corresponding plurality of fluid flow stop members positioned within the fluid flow paths to selectively halt and permit fluid flow through each fluid flow path, so as to correspondingly selectively operate a plurality of brake system elements.

6. A valve according to claim 5 including at least one valve rod link mounted upon said outer end of said valve rod and carrying a plurality of stop member actuators corresponding to the number of stop members carried in the brake valve, said stop valve evacuators being positioned to selectively engage the brake valve stop members upon appropriate rotation of the valve rod link.

7. A closed center brake system comprising in combination, a closed-center variable displacement pressure compensated pump having an inlet for receiving relatively unpressurized fluid, an outlet for discharging fluid pressurized to a given degree, an inlet for receiving pressure compensated fluid, and control means operated by the pressure compensated fluid for controlling the discharge of fluid pressure to a given degree, a brake valve having a housing defining an exhaust port, an inlet port for admitting fluid to the valve, a valve rod extending through the housing, normally closed first check valve means in the valve for selectively admitting fluid to the valve, and a check valve actuator means interconnecting the check valve and the valve rod for permitting fluid flow into the brake valve when the brake valve rod is partially withdrawn from the valve, and a pump pilot port fluid path leading from the valve to the pump for leading pressure compensated fluid out of the valve and to the pump inlet for receiving the pressure compensated fluid.

8. A closed-center brake system according to claim 7 wherein said housing further defines a bore closed at one end by a fixed end wall, said valve rod extending through the housing fixed end wall, said brake further including an apertured piston slidably disposed within the housing bore, the piston aperture defining a flow space permitting fluid to flow through the apertured piston, the brake valve further including a reaction piston carried on the brake valve rod and radially extending to cover the annular piston flow space and to move toward the annular piston to restrict fluid flow through the annular piston and out of the valve when the valve rod draws the reaction piston toward the annular piston.

9. A closed-center brake system according to claim 7 wherein said brake valve housing further defines a bore, and the valve further includes piston means carried in the bore to define a collapsible valve chamber, the valve housing further defining a fluid flow passage extending in a downstream direction from the first inlet check valve to the collapsible chamber, a second check valve being interposed in said fluid flow path for restricting fluid flow in a relative upstream direction from the chamber toward the first check valve.

10. A closed-center brake system according to claim 9 wherein said pump pilot port fluid flow path leads from a point in the valve to the pump, said valve point being located between said first and said second check valves.

11. A brake valve according to claim 7 wherein said actuator means includes cam means on the rod means, and end means extending from the first check valve to a position for engagement so as to cause check valve opening action as the rod is partially withdrawn from the valve.

12. A brake valve according to claim 7 including a plurality of branch fluid flow paths extending from the valve chamber, and a corresponding plurality of fluid flow stop members positioned within the branch fluid flow paths to selectively halt and permit fluid flow through the branch fluid flow paths so as to correspondingly selectively operate a plurality of brake system elements.

13. A valve according to claim 12 including at least one valve rod link mounted upon an outer end of said valve rod and carrying a plurality of stop member actuators corresponding to the number of stop members carried in the brake valve, said stop member actuators being positioned to selectively engage the brake valve stop members upon appropriate rotation of the valve rod link.

14. A closed-center brake system according to claim 7 wherein said brake valve housing further defines an auxiliary power outlet port leading from a point downstream of said first check valve for providing pressurized fluid to an auxiliary portion of the brake system when the valve rod is partially withdrawn from the valve.

15. A closed-center brake system according to claim 14 including vehicle differential means, the differential means including hydraulically actuated lock means for locking first and second vehicle drive means together so as to prohibit relative motion between said first and second vehicle drive means upon application of hydraulic power to the differential means, and fluid conduit means leading from said auxiliary power outlet port means to said differential means for providing hydraulic power fluid to the differential means when the valve rod is at least partially withdrawn from the brake valve.

* * * * *